United States Patent
Tanigaki et al.

(10) Patent No.: US 6,569,223 B2
(45) Date of Patent: May 27, 2003

(54) METHOD OF MANUFACTURING MOLTEN METAL IRON

(75) Inventors: Yasuhiro Tanigaki, Osaka (JP); Osamu Tsuge, Osaka (JP); Isao Kobayashi, Osaka (JP); Keisuke Honda, Osaka (JP); Koji Tokuda, Osaka (JP); Shoichi Kikuchi, Osaka (JP); Shuzo Ito, Osaka (JP)

(73) Assignee: Midrex International B.V. Zurich Branch, Zurich (CH)

( * ) Notice: Subject to any disclaimer, the term of this patent is extended or adjusted under 35 U.S.C. 154(b) by 0 days.

(21) Appl. No.: 09/819,743

(22) Filed: Mar. 29, 2001

(65) Prior Publication Data

US 2001/0025549 A1 Oct. 4, 2001

(30) Foreign Application Priority Data

Mar. 31, 2000 (JP) .................... 2000-098618

(51) Int. Cl.⁷ .............................. C21B 11/08
(52) U.S. Cl. .................... 75/484; 75/485; 222/590; 266/45
(58) Field of Search ............. 75/485, 484; 222/590; 266/45

(56) References Cited

U.S. PATENT DOCUMENTS

| | | |
|---|---|---|
| 1,885,381 A | 11/1932 | Simpson |
| 3,443,931 A | 5/1969 | Beggs et al. |
| 3,947,621 A | 3/1976 | Collin et al. |
| 3,984,231 A | 10/1976 | Ramacciotti |
| 4,701,214 A | 10/1987 | Kaneko et al. |
| 5,885,521 A | 3/1999 | Meissner et al. |
| 5,989,019 A | 11/1999 | Nishimura et al. |
| 6,063,156 A | 5/2000 | Negami et al. |
| 6,126,718 A | 10/2000 | Sawa et al. |
| 6,129,777 A | 10/2000 | Fuji et al. |
| 6,135,766 A | 10/2000 | Takeda et al. |
| 6,149,709 A | 11/2000 | Uragami et al. |
| 6,152,983 A | 11/2000 | Kamijo et al. |
| 6,210,462 B1 * | 4/2001 | Kikuchi et al. ............ 75/485 |
| 6,241,803 B1 | 6/2001 | Fuji |
| 6,251,161 B1 | 6/2001 | Tateishi et al. |

FOREIGN PATENT DOCUMENTS

| | | |
|---|---|---|
| EP | 0 969 105 | 1/2000 |
| EP | 1 026 265 | 8/2000 |
| JP | 10-147806 | 6/1998 |
| JP | 11-29806 | 2/1999 |
| JP | 11-106812 | 4/1999 |
| JP | 11-335712 | 12/1999 |
| JP | 2000-45008 | 2/2000 |
| WO | WO 97/34018 | 9/1997 |
| WO | WO 99/16913 | 4/1999 |
| WO | WO 00/29628 | 5/2000 |

* cited by examiner

*Primary Examiner*—Melvyn Andrews
(74) *Attorney, Agent, or Firm*—Oblon, Spivak, McClelland, Maier & Neustadt, P.C.

(57) ABSTRACT

A method of manufacturing a molten metal iron by charging a starting material at least comprising a carbonaceous reducing material and an iron oxide-containing material into a rotary hearth furnace, reducing under heating the charged starting material into a solid reducing iron, carburizing the metal iron in the solid reduced iron with the carbon ingredient in the carbonaceous reducing material, thereby melting the metal iron, separating the slag ingredient contained in the starting material by the melting, and discharging the molten metal alloy in the molten state as it is to the outside of the rotary hearth furnace for recovery, wherein a downward inclined surface is disposed at an angle 3 to 30° relative to the horizontal plane on the upper surface of a hearth of the rotary hearth furnace on which the starting material is placed, and the molten metal iron is discharged at the discharging position for the molten metal iron from the lowest portion of the inclined surface.

18 Claims, 11 Drawing Sheets

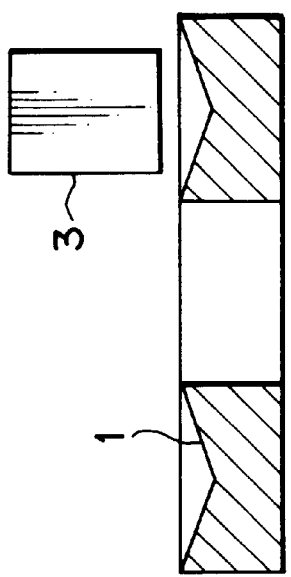
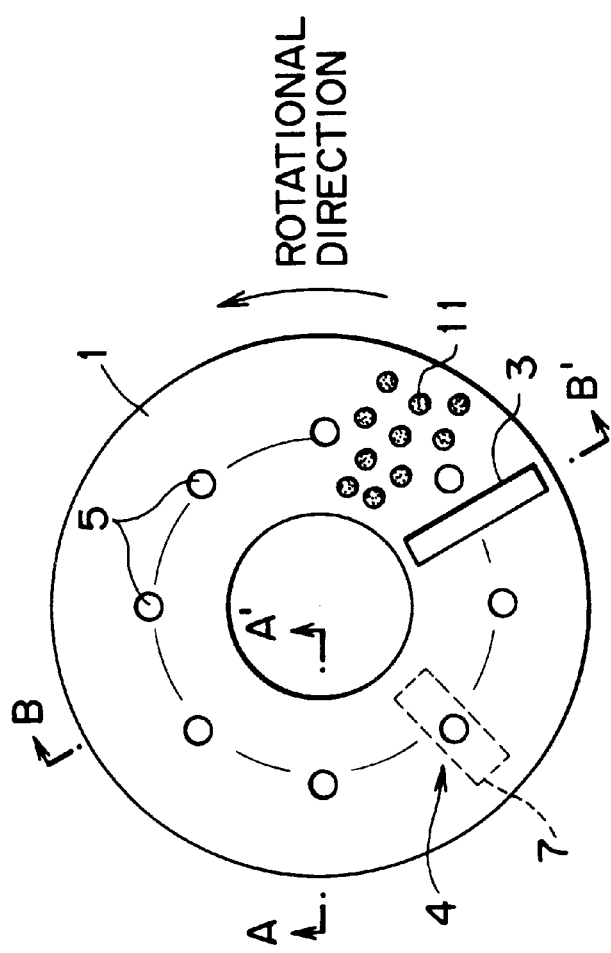
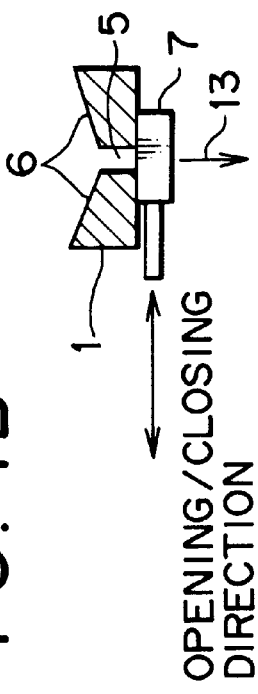

ROTATIONAL DIRECTION

ROTATIONAL DIRECTION

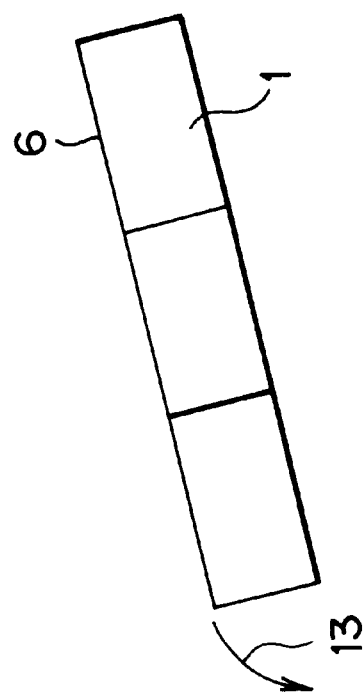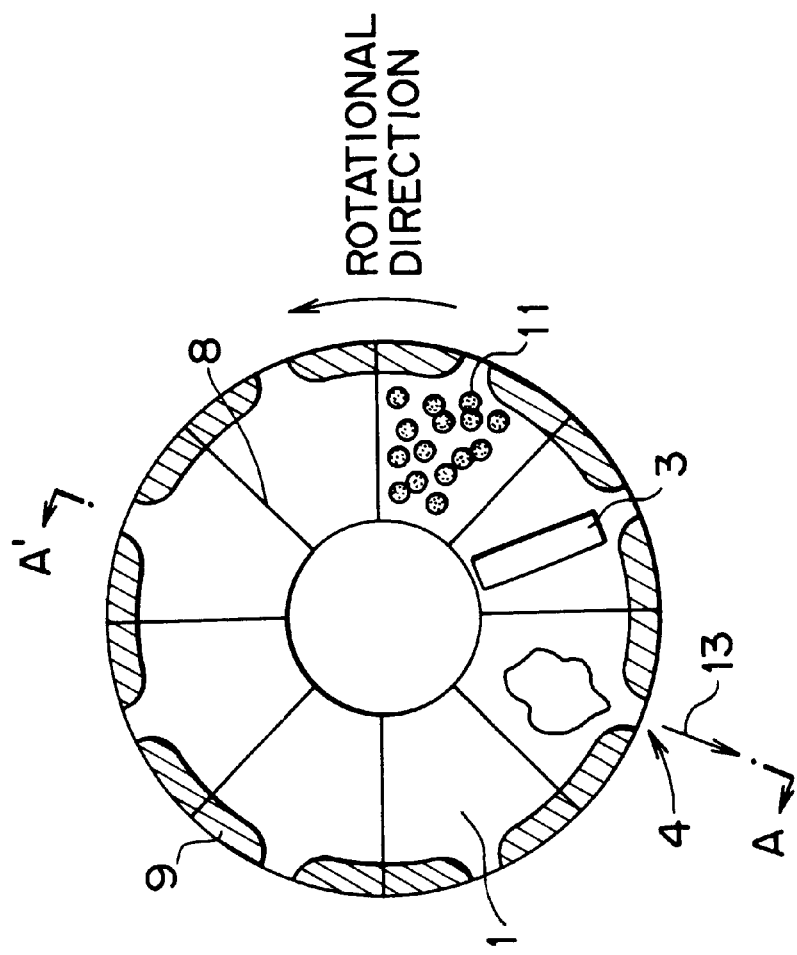

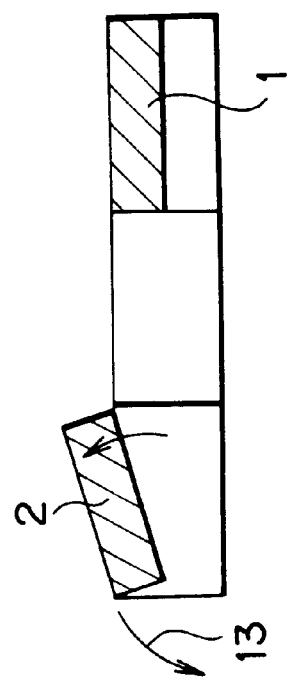
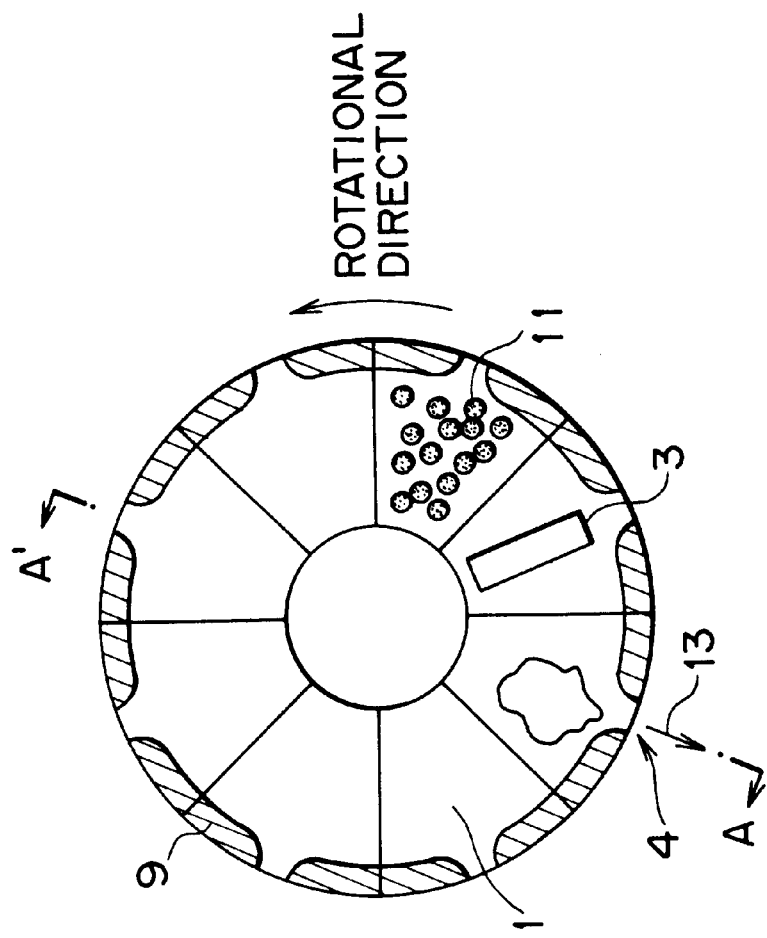

METHOD OF MANUFACTURING MOLTEN METAL IRON

BACKGROUND OF THE INVENTION

1. Field of the Invention

This invention concerns a method of manufacturing molten metal iron from iron oxide-containing material by using a rotary hearth furnace.

2. Description of the Related Art

A method of manufacturing a molten metal iron at a reduced cost by a rotary hearth furnace in a relatively simple facility and with less installation cost by using an inexpensive carbon material such as coal as a reducing material has been adopted in recent years, instead of a blast furnace method or as a method supplementary to the blast furnace method.

The molten metal iron is manufactured, for example, by a method reducing under heating a mixture of a powdery iron material and a solid powdery reducing agent in a rotary hearth furnace to produce a reduced iron, charging the mixture into a melt-reducing furnace and melting and reducing the same by using carbon material and oxygen to thereby removing slags. However, this method involves a problem that two steps of using the rotary hearth furnace and the melt-reducing furnace are required to increase the installation cost and the reduced iron has to be cooled upon discharge from the rotary hearth furnace so as to enable handling thus requiring additional energy in the melt-reducing furnace.

Then, there is a method of manufacturing a solid metal iron by reducing under heating the mixture on a rotary hearth furnace into a reduced iron, successively carburizing the reduced iron on the hearth with the carbon ingredient in the carbonaceous reducing material to melt the iron, separating the same into a metal iron and a slag ingredient and then cooling and solidifying the iron on the hearth, followed by recovery has been used. According to this method, the installation cost is lowered since the process can be conducted in one step but it still leaves a problem of high refining cost since additional energy is required for remelting the solid metal iron in a converter furnace or electric furnace upon refining.

SUMMARY OF THE INVENTION

This invention intends to provide a method of manufacturing a molten metal iron capable of discharging and recovering the molten metal iron separated from the slag on a rotary hearth furnace in the molten state as it is from the rotary hearth furnace without cooling and solidification.

In accordance with this invention, there is provided a method of manufacturing a molten metal iron by charging a starting material at least comprising a carbonaceous reducing material and an iron oxide-containing material into a rotary hearth furnace, reducing under heating the charged starting material into a solid reducing iron, carburizing the metal iron in the solid reduced iron with the carbon ingredient in the carbonaceous reducing material, thereby melting the metal iron, separating the slag ingredient contained in the starting material by the melting, and discharging the molten metal iron in the molten state as it is to the outside of the rotary hearth furnace for recovery, wherein a downward inclined surface is disposed at an angle of 3 to 30° relative to the horizontal plane on the upper surface of a hearth of the rotary hearth furnace on which the starting material is placed, and the molten metal iron is discharged at a discharging position for the molten metal iron.

In the method of manufacturing the molten metal as described above, discharge ports for the molten metal iron passing from the upper surfaces to the lower surface of the hearth are disposed in plurality, an openable/closable valve is provided to each of the discharge ports, a downward inclined surface is disposed in the upper surface of the hearth toward the discharge port, and the molten metal iron is discharged from the discharge port by opening the valve when the discharge port reaches the discharging position along with rotation of the hearth.

In the method of manufacturing the molten metal as described above, the hearth may have the downward hearth on the inner circumference of the lateral width of the hearth or may have the downwarded hearth on the outer circumference thereof, a stationary dam having a recess to at least a position is disposed along the periphery on the lower side in the lateral direction of the hearth, and the molten metal iron is discharged through the recess, the hearth is divided circumferentially into a plurality of portion by partitions and the partition is formed of a refractory partition, formed by grooving the hearth, or formed by stacking a powdery carbonaceous material on the hearth.

In accordance with this invention, there is also provided a method of manufacturing molten metal iron in which the hearth comprises a plurality of circumferentially divided hearth portions and, when each of the divided hearth portions reaches the discharging position for the molten metal iron along with rotation of the hearth, the hearth portion is tilted to discharge the molten metal iron.

In the method of manufacturing the molten metal as described above, in which the slag remaining on the hearth is discharged out of the hearth by rotation after discharging the molten metal iron and before charging the starting material, the surface of the hearth is smoothed after discharging the molten metal and before charging the start material, a hearth protection material is charged onto the hearth after discharging the slag and before charging the starting material, the hearth protection material is charged on the hearth after the smoothing and before charging the starting material, and a mixture of previously mixing the hearth protection material with the powdery carbonaceous reducing material is charged instead of the hearth protection material.

In accordance with this invention, since the molten metal iron can be recovered continuously from the rotary hearth furnace in the molten state as it is with no cooling and solidification, molten metal iron with less fluctuation in the quality can be obtained by using only the rotary hearth furnace of a reduced installation cost continuously for a long period of time without requiring additional energy, thereby remarkably reducing the manufacturing cost for the molten metal iron.

Further, since slags remaining on the hearth can be removed to maintain the upper surface of the hearth smooth, heat can be conducted uniformly over the starting material to decrease the fluctuation of quality of the molten metal iron products.

Further, by laying the hearth protection material, peeling or roughening for the upper surface of the hearth can be prevented to extend the hearth life.

Furthermore, the charging facility can be decreased by charging the hearth protection material and the powdery carbonaceous reducing material in admixture as a floor laying material.

BRIEF DESCRIPTION OF THE DRAWINGS

FIG. 1A is a plan view illustrating the structure of a hearth having a plurality of discharge ports near the lateral center line of a hearth for practicing the method of this invention;

FIG. 1B is a cross sectional view taken along line A–A' in FIG. 1A;

FIG. 1C is a cross sectional view taken along line B–B' in FIG. 1A;

FIG. 4A is a plan view illustrating the structure of a hearth divided in a circumferential direction with partitions for practicing the method according to this invention;

FIG. 4B is a cross sectional view taken along line A–A' in FIG. 4A;

FIG. 7A is a plan view for illustrating the structure of a hearth tilting a hearth portion divided in a circumferential direction for practicing the method according to this invention;

FIG. 7B of a cross sectional view taken along line A–A' in FIG. 7A;

DESCRIPTION OF THE PREFERRED EMBODIMENTS

Figure 2A:
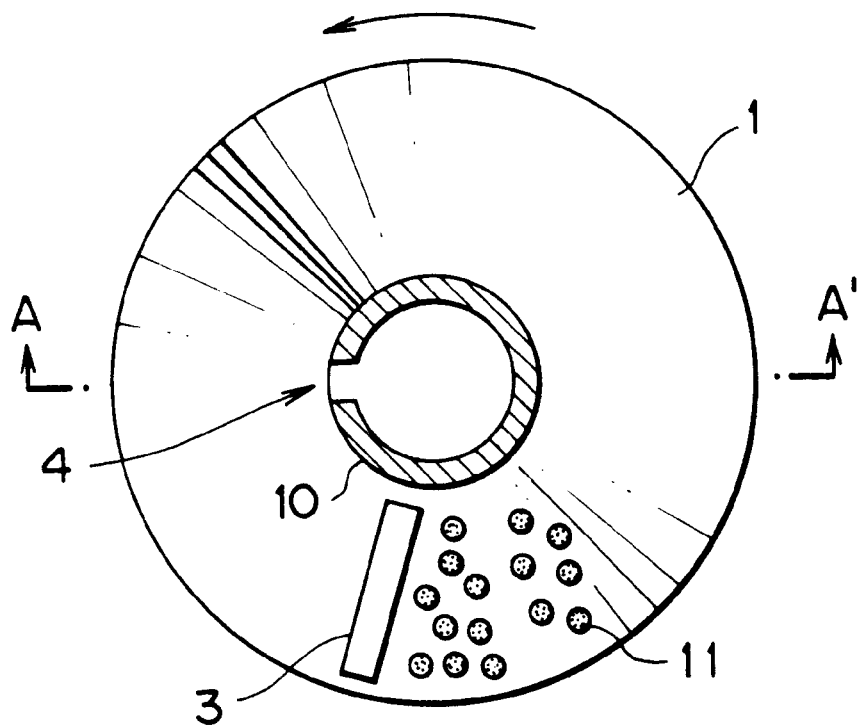
FIG. 2A is a plan view for illustrating the structure of a hearth inclined downward toward the inner circumference of the hearth for practicing the method according to this invention.

The present invention is to be explained in details with reference to preferred embodiments.

As the starting material to be charged in a rotary hearth furnace, coals, coke and oil coke can be used as the carbonaceous reducing material and iron ores, blast furnace dusts, steel making dusts, electric furnace dusts and mill scales can be used as an iron oxide-containing material. The blending ratio of the carbonaceous reducing material to the iron oxide-containing material is made somewhat excessive considering a necessary amount of carbon to reduce the iron oxide in the starting material into metal iron and, in addition, a necessary amount of carbon to carburize a metal iron. They are pulverized as required into a powdery form and mixed and then the mixture is charged as it is into the rotary hearth furnace in the powdery form or after being molded into pellets or briquettes. Upon molding, a binder such as bentonite, starch, limestone or organic binder may be added as required. Further, for facilitating separation of the metal iron from slags formed from feldspars in the iron oxide-containing material or ashes in the carbonaceous reducing material, fluxes such as calcite, dolomite or serpentine may be added to control the melting point of the slags. When water is added upon molding, the molded material may be dried at a temperature of about 200° C. or lower at which the carbonaceous reducing material does not ignite and then charged into the rotary hearth furnace.

In the structure of the hearth, for example, as shown in FIG. 1, a rotational shaft of the hearth is kept vertical as it is, discharge ports 5 for discharging the molten metal iron are disposed each at a predetermined distance about on a center line for the lateral width of the hearth 1, and a downward inclined surface 6 relative to the horizontal line along the lateral direction of the hearth is disposed toward the discharge port 5. A slide valve 7, for example, as a valve capable of opening/closing is disposed in the lower surface of each discharge port 5 so as to open/close the discharge port. For facilitating the discharging of the molten metal iron 13, sand, coke powder or slag may be filled in the discharge port 5 before charging the starting material after closing the slide valve 7 at the lower surface of the discharge port 5. Then, a starting material 11 is charged by a starting material feed device 3. For keeping the gas atmosphere near the starting material 11 to a higher reducing atmosphere such that the reduced starting material 11 is not re-oxidized in the furnace and for avoiding deposition of the molten metal iron and the slag on the hearth, a powdery carbonaceous reducing material 12 may be laid on the hearth 1 (hereinafter referred to as hearth laying), on which starting material 11 may be placed. In a case where pellets or briquettes of large size are used as the starting material 11, they are preferably arranged in one layer or two layers in order to efficiently transfer the radiation heat from above the hearth 1 to the starting material 11, and they may be arranged in three or more layers for small sized materials.

During movement of the starting material 11 in the furnace toward the discharging position 4 along with the rotation of the hearth 1, the material is heated by a plurality of burners placed above the hearth 1, and combustible volatile ingredients generated from the carbonaceous reducing material in the starting material and CO gas formed by reduction of iron oxides in the iron oxide-containing material (for example, by reaction of $FeO+C \rightarrow Fe+CO$) are burnt by secondary air in the furnace to raise the temperature of the furnace atmosphere to about 1350–1540° C., more preferably, 1430 to 1500° C. and the starting material 11 placed on the hearth 1 is heated by radiation from above.

The fuel for the burners may be gaseous fuels such as natural gas, coke furnace gas, propane gas or butane gas, liquid fuels such as heavy oils or solid fuels such as coals.

The starting material 11 placed on the hearth 1 is rapidly heated to about 1300 to 1400° C. by the radiation heating from above the hearth 1 during movement in the hearth, in which iron oxides in the iron oxide-containing material are reduced with carbon in the carbonaceous reducing material into metal and form solid reduced iron.

Since the carbonaceous reducing agent is blended in excess of a required amount for reduction in the starting material, carbon still remains in the solid reduced iron and the metal iron in the solid reduced iron is carburized with the carbon to lower the melting point, while the reduced iron is further heated to about 1400 to 1500° C. exceeding of the melting point and the metal iron is melted. The slag ingredient is also melted substantially simultaneously.

The molten metal iron and the slag are collected along the inclined surface 6 to the discharge port 5. The inclined surface 6 is preferably inclined at an angle of 3 to 30° relative to the horizontal plane. If the angle is less than 3°, the metal iron and the slug are not discharged, whereas if the angle is larger than 30°, the starting material 11 moves forward the lower side upon charging of the starting material to localize the layer thickness making heating not uniform to retard metallization and lower the productivity. Particularly, when the pellets are used as the starting material, since pellets tend to roll, a care should be taken so as not to increase the angle of inclined surface excessively. Use of the starting material in the form of briquette or powder is preferred since the angle of the inclined surface can be made larger. Accordingly, the angle may be determined properly within a range from 3 to 30° while considering the shape of the starting material, the viscosity of the molten metal iron and the smoothness of the hearth. When the hearth turns and just reaches the discharging position 4, the slide valve 7 is opened to discharge the molten metal iron 13 (and slag) from the lower portion of the discharge port 5. The molten metal iron 13 (and slag) discharged is recovered by being directly received in a pan disposed just below the discharge port 5 at the discharging position 4, or collected by way of a gutter into a pan disposed near the rotary hearth furnace. In a case where sand or coke powder is filled in the slide valve 7 for facilitating the discharge of the molten metal iron (and slag), since the amount of the sand or the coke powder is small compared with the amount of the molten metal iron 13, this causes no problem for the lowering of the temperature or the fluctuation of the ingredient of the molten metal iron 13. The thus recovered molten metal iron 13 is removed with the slag optionally and then transported to and refined in the next step such as a converter furnace or electric furnace.

Figure 2B:
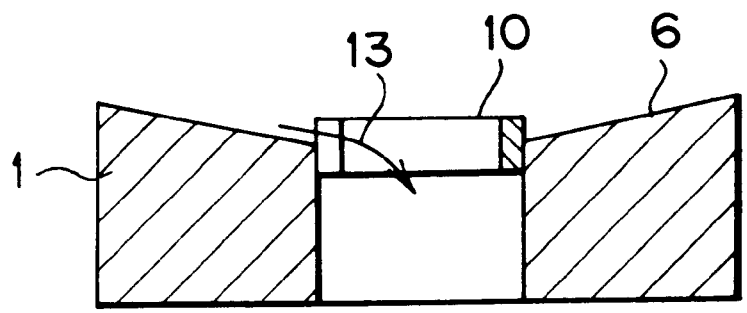
FIG. 2B is a cross sectional view taken along line A–A' in FIG. 2A.

For the structure of the hearth, as shown in FIG. 2, the rotational shaft for the hearth may be kept vertical as it is, the hearth surface may be inclined downward toward the inner circumference of the hearth 1, and a stationary dam 10 made, for example, of a refractory material with a height not overflowing the molten metal iron may be disposed along the entire inner circumference of the hearth 1 while being recessed only for a portion near the discharging position 4. Since this can discharge the molten metal iron 13 continuously from the discharging position 4 with no mechanical operation, operation trouble caused by mechanical trouble can be avoided.

Figure 3A:
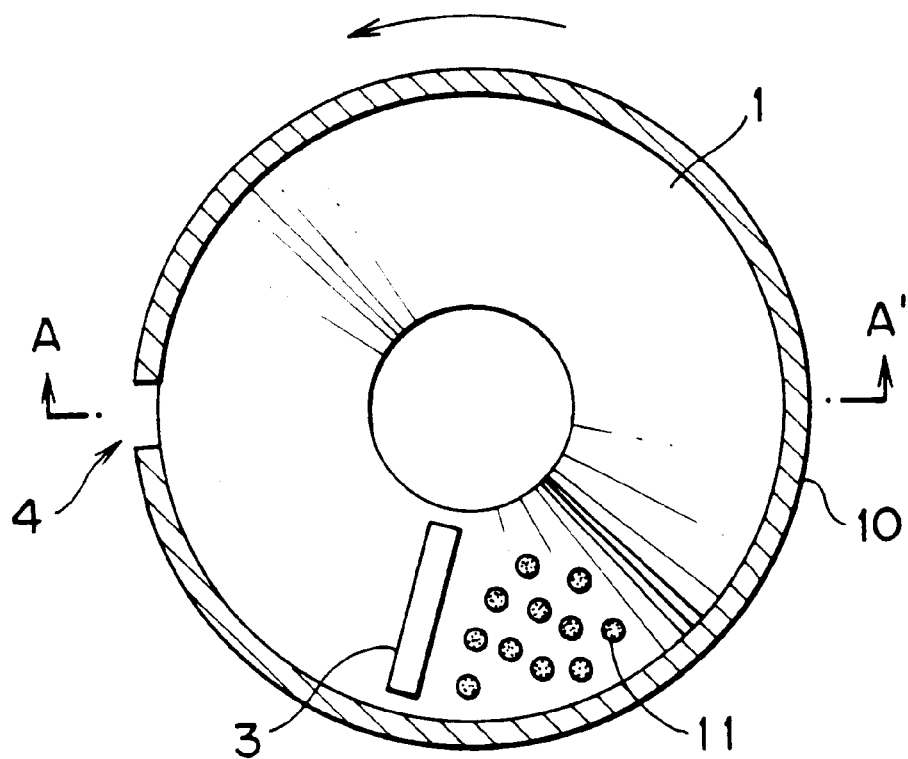
FIG. 3A is a plan view for illustrating the structure of a hearth inclined downward toward the outer circumference of the hearth for practicing the method according to this invention.
Figure 3B:
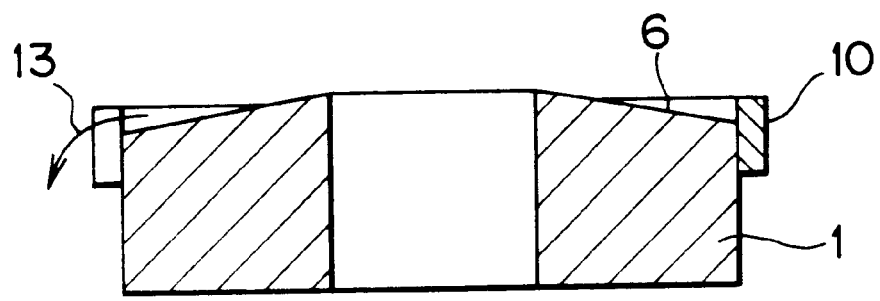
FIG. 3B is a cross sectional view taken along line A–A' in FIG. 3A.

Further, as shown in FIG. 3, the rotational shaft for the hearth may also be kept vertical and the hearth surface may be inclined toward the outer circumference of the hearth 1 in the manner opposite to that in FIG. 2, and a stationary dam 10 may be disposed along the outer circumference of the hearth 1. Although this makes the length of the stationary dam 10 longer compared with that in FIG. 2 but, since the molten metal iron 13 can be discharged from the outside of the furnace, monitoring for the trouble or maintenance during discharge is facilitated.

Further, as shown in FIG. 4, the hearth 1 may be divided with partitions 8 such as made of a refractory material into plurality sections in the circumferential direction, the hearth surface may be made vertical to the rotational shaft of the hearth and the rotational shaft of the hearth may not be not kept vertical but tilted to incline the entire hearth downward toward the discharging position, discharging position 4 being at the lowermost end. This can avoid discharge of reduced iron not yet melted and separated sufficiently and only the metal iron sufficiently melted and separated from the slag ingredient can be discharged. For facilitating the discharge of the molten metal iron 13, a dam made of a refractory material having a groove for discharging the molten metal iron 13 at the outer circumference may be disposed on every divided hearth.

Figure 5A:
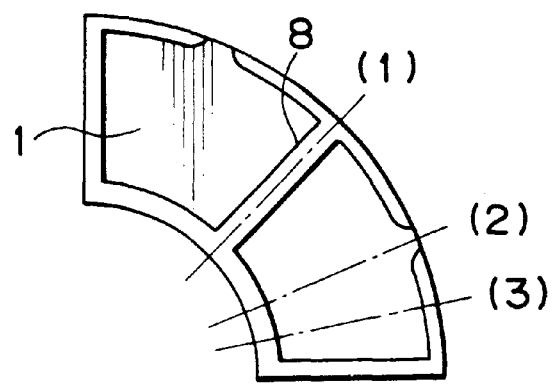
FIG. 5A is a plan view for illustrating the structure of a hearth divided with the partition formed by grooving a hearth for practicing the method according to this invention.
Figure 5B:
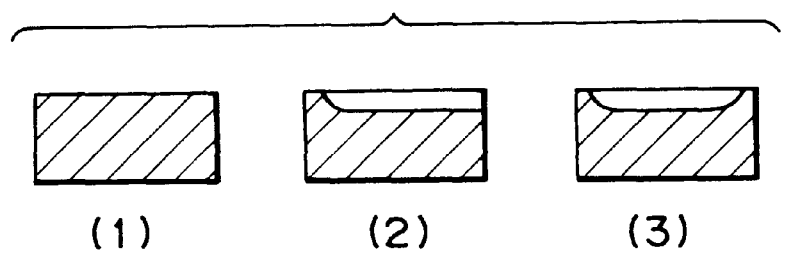
FIG. 5B is a cross sectional view for FIG. 5A.

Further, while tilting the rotational shaft of the hearth like that in FIG. 4, the hearth 1 may be dug downwardly to form a dam having a partition 8 and a groove, as shown in FIG. 5, for discharging the molten metal iron may be formed instead of the partition and the dam of the refractory material, to obtain the same effect as that in FIG. 4.

Figure 6:
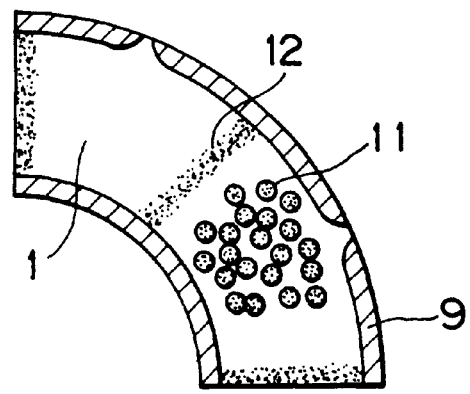
FIG. 6 is a view illustrating the structure of a hearth divided with partitions formed by stacking powdery carbonaceous reducing material for practicing the method according to this invention.
Figure 8:
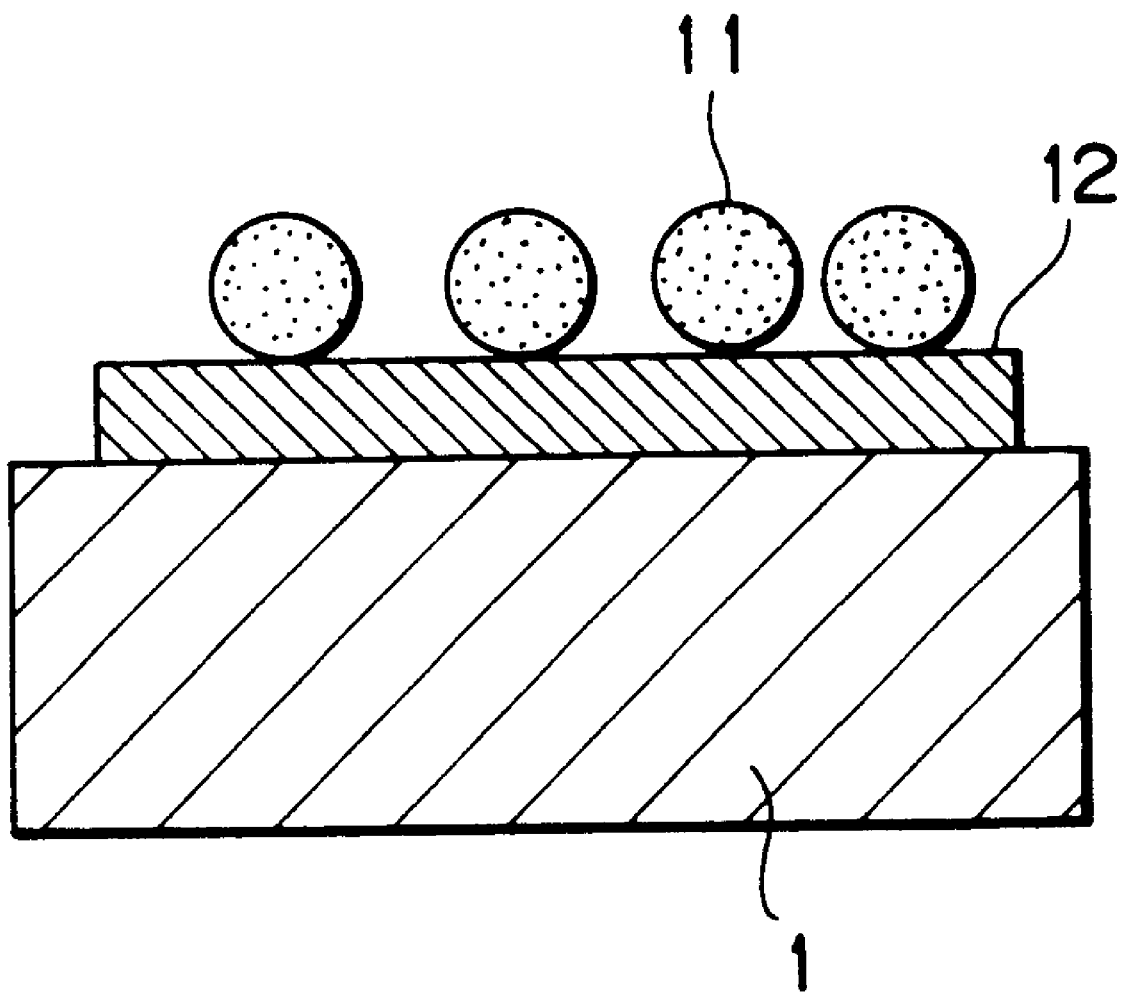
FIG. 8 is a view illustrating a state of loading starting material onto the hearth for practicing the method according to this invention.

Alternatively, while tilting the rotational shaft of the hearth like that in FIG. 4 and FIG. 5, partitions may be formed by stacking the powdery carbonaceous reducing material 12 onto the hearth 1 each at a predetermined distance as shown in FIG. 6. In this case, the powdery carbonaceous reducing material 12 forming the partitions has an effect of making the gas atmosphere near the starting material to a reducing atmosphere in addition to the effects in FIG. 4 and FIG. 5. It has also a merit capable of simplifying the structure of the hearth.

Further, as shown in FIG. 7, the rotational shaft for the hearth may be kept vertical and the substantially horizontal hearth 1 may be divided circumferentially into a plurality of portions and the inner circumferential portion of the divided hearth portion 2 may be raised at the discharging position 4 to discharge the molten metal iron 13 stagnated in the hearth portion 2 from the outer circumference of the hearth 1. Since the inclined angle of the hearth portion 2 can be easily changed by changing the raising height, the molten metal iron 13 can be discharged irrespective of the shape of the starting material, the viscosity of the molten metal iron and the smoothness of the hearth. The upper surface of the hearth portion 2 at the position other than that for the discharging position 4 is preferably kept substantially horizontal (for example, at an inclination of 5° or less relative to the horizontal plane) such that the starting material does not localize upon discharge of the starting material. This enables to use easily rolling pellets also as the starting material. The same effect can be obtained also by lowering the outer circumference instead of raising the inner circumference of the hearth portion 2. Alternatively, the molten metal iron may be discharged from the inner circumference of the hearth by raising the outer circumference of the hearth or lowering the inner circumference of the hearth. Furthermore, one of the divided portions of the hearth portion 2 may be lowered to discharge the molten metal iron below the hearth.

Whether the rotational shaft of the hearth is kept vertical or inclined or whether the angle between the rotational shaft and the upper surface of the hearth makes a right angle or not may be selected properly such that the inclined surface described above is formed on the upper surface of the hearth, not being restricted to the embodiments described above.

Figure 9A:
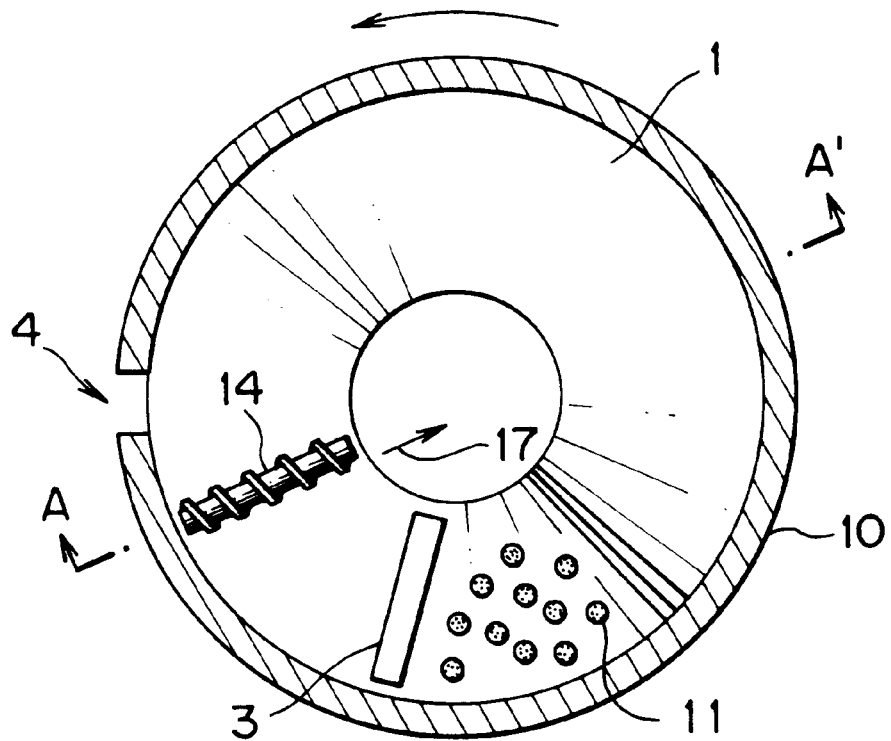
FIG. 9A is a plan view explaining means for discharging slags remaining on the upper surface of the hearth toward the inner circumference side of the hearth for practicing the method according to this invention.
Figure 9B:
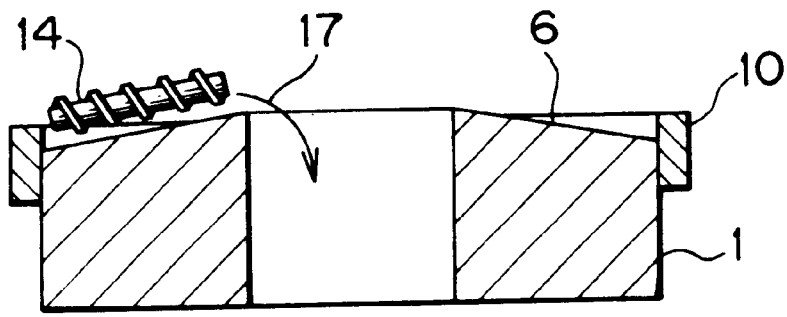
FIG. 9B is a cross sectional view taken along line A–A' in FIG. 9A.
Figure 10A:
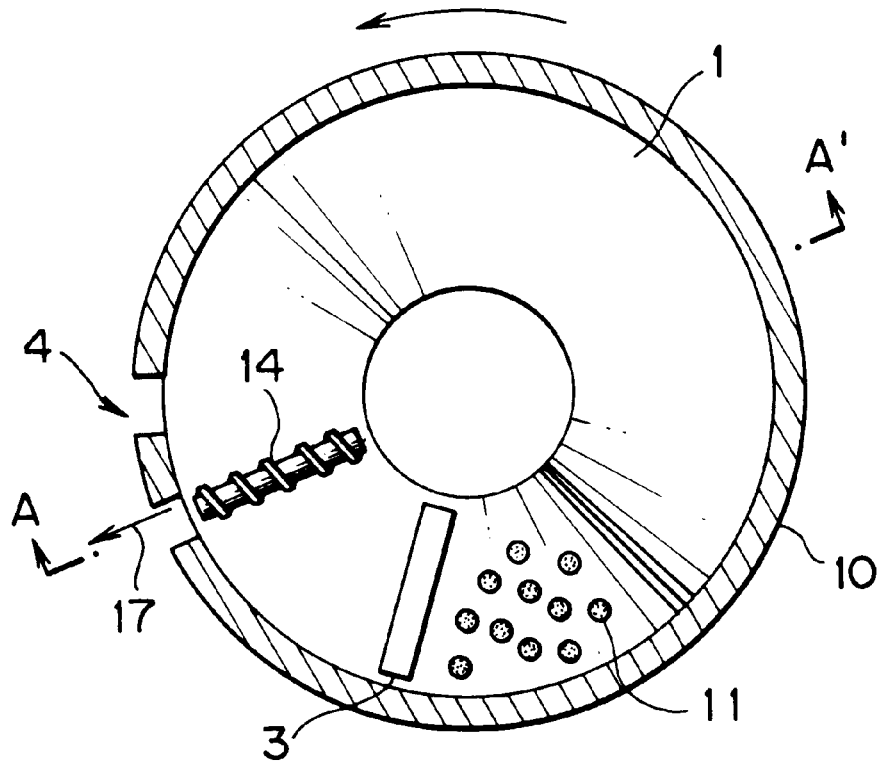
FIG. 10A is a plan view explaining means for discharging slags remaining on the upper surface of the hearth toward the outer circumference of the hearth for practicing the method according to this invention.
Figure 10B:
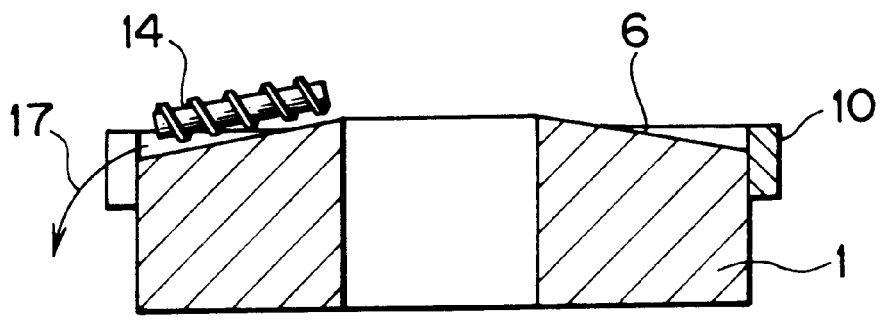
FIG. 10B is a cross sectional view taken along line A–A' in FIG. 10A.

When the melting point of the slag is high, the slag may sometimes remain on the hearth. In such a case, as shown in FIG. 9 and FIG. 10, it is desirable that a slag discharge means 14, for example, a screw is disposed between the discharging position 4 for the molten metal iron and the starting material feed device 3 in the rotational direction of the hearth such that the slag remained on the hearth after discharge of the molten metal iron 13 is discharged out of the rotary hearth furnace. As shown in FIG. 10, in a case of discharging the slag on the side of the stationary dam 10, a recess for discharging the slag may be formed at a position different from the discharging position 4 for the molten metal iron and the slag may be discharged through the recess.

Figure 11:
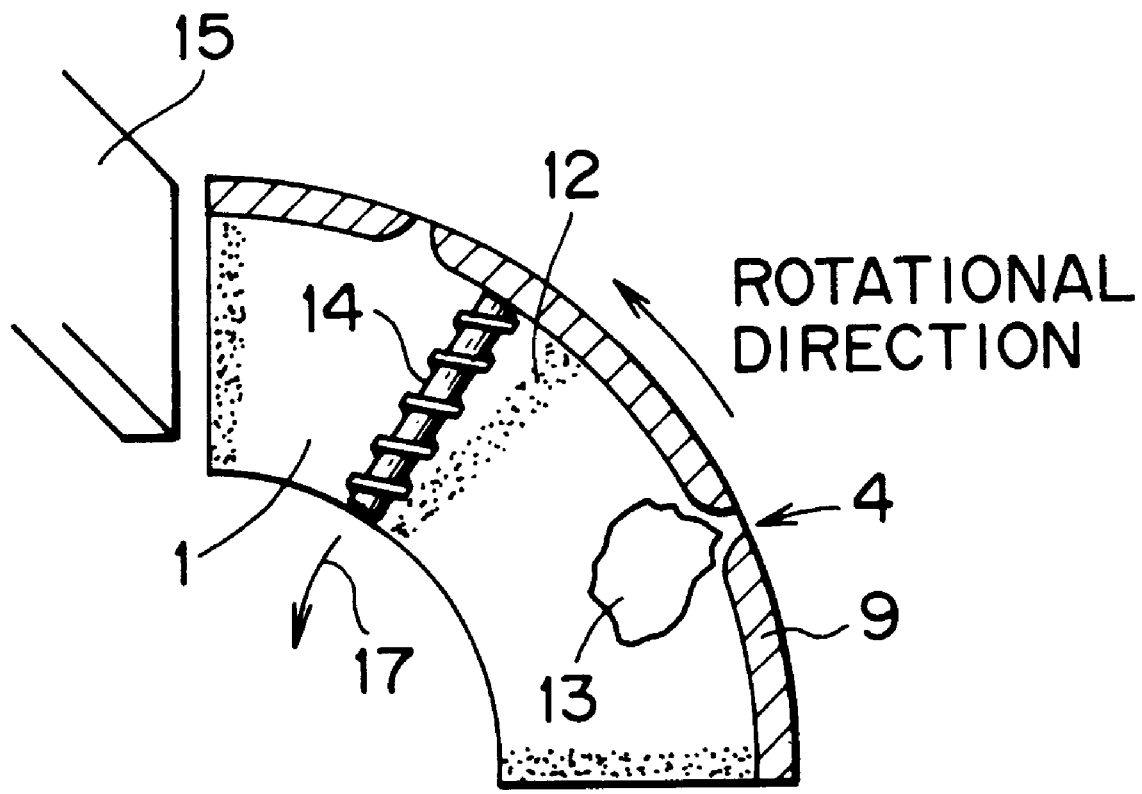
FIG. 11 is a view for illustrating means for discharging and charging powdery carbonaceous reducing material for floor laying or partition for practicing the method according to this invention.

Further, in a case of using the powdery carbonaceous reducing material 12 for hearth laying or partition, the powdery carbonaceous reducing material 12 may be discharged together with the remaining slag by the slag discharge means 14 after discharging the molten metal iron as shown in FIG. 11. After discharging and before feeding of the starting material, new powdery carbonaceous reducing material 12 may be supplied to the hearth to form hearth laying or partition by the powdery carbonaceous reducing material feed means 15. The thus discharged powdery carbonaceous reducing material can be optionally crushed and sieved to remove the slag and then utilized again for hearth laying and partition.

In a case of disposing the refractory partition to the hearth or forming the partition by grooving the hearth (refer to FIG. 4 and FIG. 5), the slag or the powdery carbonaceous reducing material may be discharged from the surface of the hearth by a rotary brush not illustrated or gas blowing.

Figure 12:
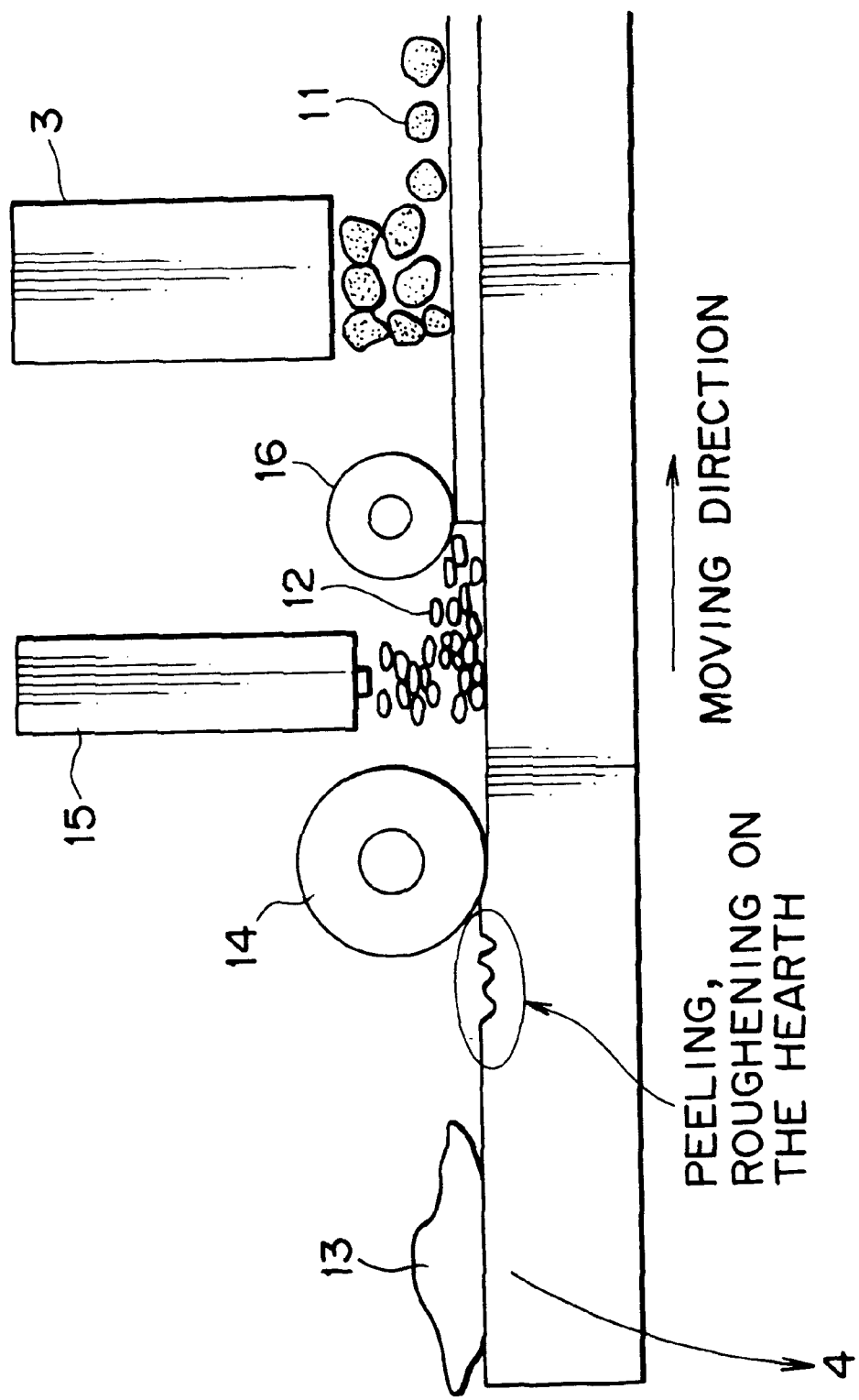
FIG. 12 is a view illustrating means for smoothing the upper surface of the hearth and laying the hearth protection material (or mixture of a powdery carbonaceous reducing material and a hearth protection material) on the hearth for practicing the method according to this invention.

Since it may be worried that the upper surface of the hearth may be defoliated or roughened by contact with the molten metal iron or slag, it is preferred, for example, as shown in FIG. 12, to use the screw of the slag discharge means 14 also as a hearth surface smoothing means 14 after discharging the molten metal iron 13, or to dispose a separate screw to be used exclusively as the hearth surface smoothing means 14, to flatten the upper surface of the hearth by scraping. After smoothing, pulverized products of the discharged slag, oxide powders of high heat resistance and corrosion resistance such as aluminum or magnesia may be laid alone or as an appropriate mixture on the hearth by utilizing the powdery carbonaceous reducing material feed means 15. Further, the hearth protection material may be laid in admixture with the hearth laying powdery carbonaceous reducing material. Further, after laying them, they may be leveled optionally by using a leveling means 16 such as a leveler.

The laying thickness is preferably such that the molten metal iron or slag is not in direct contact with the upper surface of the hearth.

Further, the hearth protection material or the mixture of the carbonaceous reducing material with the hearth protection material can also be used as the partition described above.

What is claimed is:

1. A method of manufacturing a molten metal iron comprising the following steps:

charging a starting material at least comprising a carbonaceous reducing material and an iron oxide-containing material into a rotary hearth furnace, reducing under heating the charged starting material into a solid reducing iron, carburizing the metal iron in the solid reduced iron with the carbon ingredient in the carbonaceous reducing material, thereby melting the metal iron, separating the slag ingredient contained in the starting material by the melting, and discharging the molten metal iron in the molten state as it is at a discharging position for the molten metal iron to the outside of the rotary hearth furnace for recovery, by disposing a downward inclined surface at an angle of by 3 to 30° relative to the horizontal plane on the upper surface of the hearth of the rotary hearth furnace on which the starting material is placed.

2. A method of manufacturing a molten metal iron as defined in claim 1, wherein a plurality of discharge ports for the molten metal iron passing from the upper surface to the lower surface of the hearth are disposed to the hearth, an openable/closable valve is disposed in each of the discharge ports, the downward inclined surface is disposed to the upper surface of the hearth toward each of the discharge ports, and the molten metal iron is discharged through the discharge port by opening the valve when the discharge port reaches the discharging position along with the rotation of the hearth.

3. A method of manufacturing a molten metal iron as defined in claim 1, wherein the hearth has the downwarded inclined surface toward the inner circumference or the outer circumference of the lateral width of the hearth.

4. A method of manufacturing a molten metal iron as defined in claim 1, wherein a stationary dam having a recess in at least one portion is disposed along the periphery of the lower side in the lateral width direction of the hearth, and the molten metal iron is discharged through the recess.

5. A method of manufacturing a molten metal iron as defined in claim 1, wherein the hearth is divided in the circumferential direction into plurality of portions by partitions.

6. A method of manufacturing a molten metal iron as defined in claim 5, wherein the partitions are partitions made of a refractory material or partitions formed by stacking a powdery carbonaceous material on the hearth.

7. A method of manufacturing a molten metal iron as defined in claim 5, wherein the partitions are formed by grooving down the hearth.

8. A method of manufacturing a molten metal iron as defined in claim 1, wherein the slag remaining on the hearth is discharged out of the rotary hearth furnace after discharging the molten metal iron and before charging the starting material.

9. A method of manufacturing a molten metal iron as defined in claim 1, wherein the surface of the hearth is smoothed after discharging the molten metal iron and before charging the starting material.

10. A method of manufacturing a molten metal iron as defined in claim 1, wherein a hearth protection material is charged on the hearth after discharging the molten metal iron and before charging the starting material.

11. A method of manufacturing molten metal iron as defined in claim 9, wherein the hearth protection material is charged on the hearth before charging the starting material and after the smoothing.

12. A method of manufacturing a molten metal iron as defined in claim 10, wherein a mixture formed by previously mixing the powdery carbonaceous reducing material with the hearth protection material is charged instead of the hearth protection material.

13. A method of manufacturing a molten metal iron as defined in claim 1, wherein the slag remaining on the hearth is discharged out of the rotary hearth furnace after discharging out of the rotary hearth furnace after discharging the molten metal iron and before charging the starting material.

14. A method of manufacturing a molten metal iron as defined in claim 1, wherein the surface of the hearth is smoothed after discharging the molten metal iron and before charging the starting material.

15. A method of manufacturing a molten metal iron as defined in claim 1, wherein a hearth protection material is charged on the hearth after discharging the molten metal iron and before charging the starting material.

16. A method of manufacturing a molten metal iron as defined in claim 14, wherein the hearth protection material is charged on the hearth before charging the starting material and after the smoothing.

17. A method of manufacturing a molten metal iron as defined in claim 15, wherein a mixture formed by previously mixing the powdery carbonaceous reducing material with the hearth protection material is charged instead of the hearth protection material.

18. A method of manufacturing a molten metal iron by molding a starting material at least comprising a carbonaceous reducing material and an iron oxide-containing material, charging the molded starting material into a rotary hearth furnace, reducing under heating the charged starting material into a solid reduced iron, carburizing the metal iron in the solid reduced iron with the carbon ingredient in the carbonaceous reducing material, thereby melting the metal iron, separating the slag ingredient contained in the starting material by the melting, and discharging the molten metal iron in the molten state as it is to the outside of the rotary hearth furnace for recovery, wherein a downward inclined surface is disposed at an angle of 3 to 30° relative to the horizontal plane on the upper surface of a hearth of the rotary hearth furnace on which the starting material is placed, and the molten metal iron is discharged at a discharging position for the molten metal iron from the lowest portion of the inclined surface.

* * * * *